US010095395B2

(12) United States Patent
Yamada

(10) Patent No.: US 10,095,395 B2
(45) Date of Patent: Oct. 9, 2018

(54) COMPUTER WITH TOUCH PANEL, OPERATION METHOD, AND RECORDING MEDIUM

(71) Applicant: FUJIFILM Corporation, Minato-ku, Tokyo (JP)

(72) Inventor: Kenta Yamada, Tokyo (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 274 days.

(21) Appl. No.: 14/743,518

(22) Filed: Jun. 18, 2015

(65) Prior Publication Data
US 2015/0286395 A1 Oct. 8, 2015

Related U.S. Application Data

(63) Continuation of application No. PCT/JP2013/007400, filed on Dec. 17, 2013.

(30) Foreign Application Priority Data

Dec. 21, 2012 (JP) ................. 2012-279438

(51) Int. Cl.
G09G 1/00 (2006.01)
G06F 3/0484 (2013.01)
(Continued)

(52) U.S. Cl.
CPC .......... G06F 3/04847 (2013.01); G06F 3/017 (2013.01); G06F 3/04812 (2013.01);
(Continued)

(58) Field of Classification Search
CPC ...... G06F 3/041; G06F 3/0484; G06F 3/0488; G06F 3/01
See application file for complete search history.

(56) References Cited

U.S. PATENT DOCUMENTS

2010/0053221 A1  3/2010  Kaneko et al.
2013/0063384 A1*  3/2013  Ito .................. G01C 21/3664
                                          345/173
(Continued)

FOREIGN PATENT DOCUMENTS

JP  2010-086519 A  4/2010
JP  2011-083619 A  4/2011
(Continued)

OTHER PUBLICATIONS

Communication dated Sep. 15, 2015 from the Japanese Patent Office in counterpart application No. 2012-279438.
(Continued)

Primary Examiner — Michael Faragalla
(74) Attorney, Agent, or Firm — Sughrue Mion, PLLC

(57) ABSTRACT

In a computer with a touch panel, displaying a plurality of images on the touch panel using a display parameter preset to each image, and changing, when a touch gesture associated with changing the display parameter is performed on the touch panel for any one of the plurality of displayed images, the display parameter according to the touch gesture for all of the images other than an image somewhere in the display area of which is being pressed when the touch gesture is performed.

5 Claims, 3 Drawing Sheets

(51) Int. Cl.
*G06F 3/0488* (2013.01)
*G06F 3/01* (2006.01)
*G06F 3/0481* (2013.01)
*G09G 5/14* (2006.01)

(52) U.S. Cl.
CPC ...... *G06F 3/04842* (2013.01); *G06F 3/04845* (2013.01); *G06F 3/04886* (2013.01); *G09G 5/14* (2013.01); *G06F 2203/04803* (2013.01); *G06F 2203/04808* (2013.01); *G09G 2354/00* (2013.01); *G09G 2380/08* (2013.01)

(56) References Cited

U.S. PATENT DOCUMENTS

2013/0141366 A1* 6/2013 Ritter .................. G06F 3/041
 345/173
2014/0359526 A1* 12/2014 Oshima ................ G06F 3/0488
 715/798

FOREIGN PATENT DOCUMENTS

| JP | 2011-242820 A | 12/2011 |
| JP | 2013-114558 A | 6/2013 |

OTHER PUBLICATIONS

International Search Report of PCT/JP2013/007400 dated Feb. 25, 2014.

* cited by examiner

COMPUTER WITH TOUCH PANEL, OPERATION METHOD, AND RECORDING MEDIUM

CROSS-REFERENCE TO RELATED APPLICATIONS

This application is a Continuation of PCT International Application No. PCT/JP2013/007400 filed on Dec. 17, 2013, which claims priority under 35 U.S.C. § 119 (a) to Japanese Patent Application No. 2012-279438 filed on Dec. 21, 2012. Each of the above applications is hereby expressly incorporated by reference, in its entirety, into the present application.

BACKGROUND OF THE INVENTION

Technical Field

The present invention relates to a computer with a touch panel that allows for displaying a plurality of images side-by-side on the touch panel and performing observation while changing a display parameter, an operation method thereof; and a program.

Background Art

In the field of medicine, displaying a plurality of images side-by-side on a screen and performing observation while changing a display parameter, such as a display magnification, are performed widely. When displaying a plurality of images side-by-side and performing observation in this way, it may sometimes be necessary to perform observation while switching between an interlock mode in which a display parameter is changed for a plurality of images in an interlocking manner according to the instruction input to change the display parameter for any one image is detected and a non-interlock mode in which the display parameter is changed only for the one image for which the change instruction is received, and controlling the display parameter.

In this case, as a switching method between interlocking and non-interlocking, it is generally conceivable that a button for receiving a switching instruction between interlocking and non-interlocking is displayed outside the area of a screen where observation target images are displayed and switching between interlocking and non-interlocking is made each time a mouse operation by the user to press the button is detected.

Japanese Unexamined Patent Publication No. 2011-083619 proposes a method for displaying two three-dimensional images on the screen and performing comparative observation in which an operation by the user to change a display parameter, such as observation angle or a magnification ratio, for one image without pressing SHIFT key of a keyboard causes the display parameter to be changed for both images synchronously, and an operation to change the display parameter for one image along with pressing SHIFT key of the keyboard causes the display parameter to be changed only for the one image.

SUMMARY OF INVENTION

In recent years, devices with touch panels have spread widely and, in particular, tablet computers have been used also in the field of medicine mainly because of their good portability and operability. If it is allowed to display a plurality of images side-by-side on the touch panel of a tablet computer and to perform observation while changing a display parameter, a doctor, the user of the computer, may observe medical images while performing various operations on the images in a desired place, including a patient room and an operating room.

A tablet computer receives direct input with a finger or a pen on the touch panel, instead of indirect mouse or keyboard input and, therefore, it is conceivable that the switching between interlocking and non-interlocking is made by displaying a button for receiving a switching instruction between interlocking and non-interlocking outside the area of the touch panel where observation target images are displayed and switching between interlocking and non-interlocking is made each time a touch operation by the user to tap the button is detected. The switching between interlocking and non-interlocking can also be made according to whether or not a button provided, for example, on a side face of the tablet body is pressed, instead of the SHIFT key input described in Japanese Unexamined Patent Publication No. 2011-083619.

But, pressing the button provided outside the image display area of the screen or on a side face of the tablet body may not be performed intuitively by the user, thereby posing a problem of being inferior in operability.

In view of the circumstances described above, it is an object of the present invention to provide a computer with a touch panel that allows for easy switching between interlocking and non-interlocking for a display parameter change by an intuitive operation when displaying a plurality of images side-by-side on the touch panel and performing observation while changing a display parameter, thereby improving work efficiency, an operation method thereof, and a program.

An operation method of the present invention is a method for operating a computer with a touch panel according to an operation performed by a user on the touch panel, the method including the steps of displaying a plurality of images on the touch panel using a display parameter preset to each image and changing, when a touch gesture associated with changing the display parameter is performed on the touch panel for any one of the plurality of displayed images, the display parameter according to the touch gesture for all of the images other than an image somewhere in the display area of which is being pressed when the touch gesture is performed (first method).

Here, "changing the display parameter according to the touch gesture" refers to that the display parameter is changed by a change amount defined by the touch gesture for the image for which the touch gesture is performed (hereinafter, also referred to as "operation image"), and for the other images, the display parameter is changed by the same change amount as that of the operation image or, in a case, for example, where tomographic images are obtained one by one from each of a plurality of tomographic image groups and displayed side-by-side on the touch panel, in which tomographic images representing the same cross-section position are associated with between the plurality of tomographic image groups, the display parameter is changed such that the image after the change corresponds to the operation image after the change based on the correspondence relationship.

Here, it is assumed that the touch gesture does not include an operation that makes somewhere in the image display area being pressed, and a touch gesture and an operation to press somewhere in the display area are not performed simultaneously for one image.

An operation method of the present invention is a method for operating a computer with a touch panel according to an operation performed by a user on the touch panel, the method including the steps of displaying a plurality of images on the touch panel using a display parameter preset to each image and changing, when a touch gesture associated with changing the display parameter is performed on the touch panel for any one of the plurality of displayed images, the display parameter according to the touch gesture only for the image for which the touch gesture is performed and an image somewhere in the display area of which is being pressed when the touch gesture is performed (second method).

First and second operation programs of the present invention cause a computer with a touch panel to perform the first and the second operation methods described above respectively.

First and second computers with touch panels of the present invention include image display processing units and parameter change processing units that perform the first and the second operation methods described above respectively.

In the computers with touch panels, operation methods thereof, and programs described above, the touch gesture may be any one of drag, flick, pinch-in, pinch-out, and double-tap operations.

Further, the display parameter may be display magnification (magnification ratio), display center position (position of an image placed at the center of the display area), display angle (image orientation), window level, or window width. In a case where the position of a cross-section represented by each cross-sectional image is known and cross-sectional images are switched and displayed, the cross-section position may be a display parameter. Further, in a case where a pseudo three-dimensional image is generated, for example, by volume rendering or surface rendering based on volume data, the observation direction in the three-dimensional region represented by the volume data may be a display parameter.

According to the first computer with a touch panel, operation method thereof, and program of the present invention, a plurality of images is displayed on the touch panel using a display parameter preset to each image, and when a touch gesture associated with changing the display parameter is performed on the touch panel for any one of the plurality of displayed images, the display parameter is changed according to the touch gesture for all of the images other than an image somewhere in the display area of which is being pressed when the touch gesture is performed. When displaying a plurality of images side-by-side on a touch panel and performing observation while changing a display parameter, this allows the user to easily switch between interlocking and non-interlocking for a display parameter change between images by an intuitive operation. This makes it possible to improve the work efficiency.

According to the second computer with a touch panel, operation method thereof, and program of the present invention, a plurality of images is displayed on the touch panel using a display parameter preset to each image, and when a touch gesture associated with changing the display parameter is performed on the touch panel for any one of the plurality of displayed images, the display parameter is changed according to the touch gesture only for the image for which the touch gesture is performed and an image somewhere in the display area of which is being pressed when the touch gesture is performed. When displaying a plurality of images side-by-side on a touch panel and performing observation while changing a display parameter, this allows the user to easily switch between interlocking and non-interlocking for a display parameter change between images by an intuitive operation. This makes it possible to improve the work efficiency.

DESCRIPTION OF EMBODIMENTS

Hereinafter, embodiments of a computer with a touch panel, operation method thereof, and program of the present invention will be described with reference to the accompanying drawings. In the embodiments described herein below, the computer with a touch panel (hereinafter "touch panel computer") is a tablet computer on which an operation program of the present invention is installed. The operation program is distributed stored in a recording medium, for example, in an SD card, and installed on the computer with a touch panel from the recording medium. Otherwise, the program is stored in a storage of a server computer connected to a network or in a network storage in a manner accessible from outside, and down-loaded and installed on the tablet computer used by a doctor according to a request from the doctor.

Figure 1:
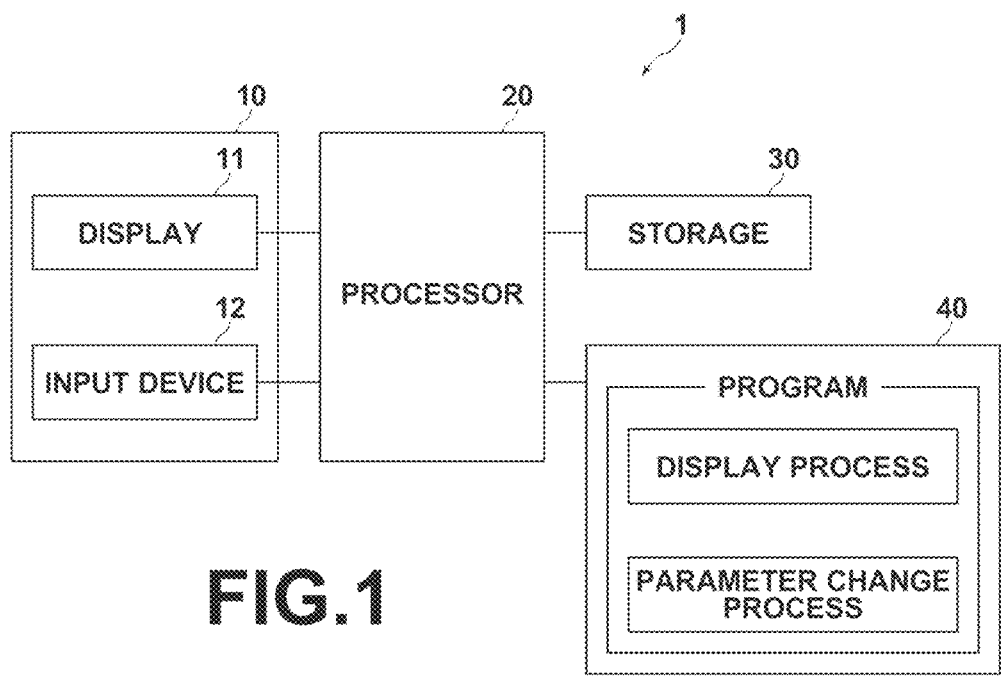
FIG. 1 is a diagram of a touch panel computer according to one embodiment of the present invention, illustrating a schematic configuration thereof.

FIG. 1 is a diagram of a touch panel computer 1 realized by installing the operation program on a tablet computer, illustrating a schematic configuration thereof. As illustrated in the drawing, the touch panel computer 1 includes a touch panel 10, a processor 20, a storage 30, a memory 40, and the like.

The touch panel 10 includes a display 11 and an input device 12 composed of a touch pad disposed on or in front of the display 11 and the like. The input device 12 recognizes a touch on the touch pad, as well as the touched position and strength, and reports them to the processor 20. In response to this, the processor 20 may interpret the touch and start a task according to the specific touch.

The storage 30 stores a plurality of observation target image data. For example, a plurality of volume data of the same patient captured at different times are stored. Here, an arrangement may be adopted in which, when user input identifying a plurality of observation target images and instructing to display the images on an observation screen is received, the storage 30 obtains and stores image data of the identified images from, for example, an imaging system (not shown) or an image storage server (not shown) via a network.

The memory 40 stores the operation program. The operation program defines processes to be executed by the processor 20, including an image display process and a parameter change process. Execution of these processes by the processor 20 according to the operation program causes the tablet computer to function as an image display processing unit and a parameter change processing unit.

Hereinafter, specific processes (image display process and parameter change process) performed by the touch panel computer 1 will be described. The touch panel computer 1 receives, in a selection menu, user input identifying a plurality of observation target images and instructing to display the images on an observation screen, obtains a plurality of observation target image data from the storage 30, and displays the plurality of images on the touch panel using a display parameter preset to each image. For example, the touch panel computer 1 receives input instructing to display a plurality of volume data of the same patient captured at different times, then from the respective volume rendering data, generates volume rendering images from a preset observation direction, and displays a plurality of volume rendering images side-by-side.

Next, the touch panel computer 1 detects a touch operation performed by the user on the touch panel for an image, changes a parameter corresponding to the touch operation, and updates the display of the touch panel according to the changed parameter. The processor 20 is configured to distinguish and recognize a plurality of touch gestures, each touch gesture being associated with a parameter to be changed by the touch gesture, and their correspondence relationships are stored. For example, correspondence relationships in which drag operation is associated with observation direction and pinch-in/pinch-out operation is associated with display magnification are stored. These correspondence relationships may be made arbitrarily settable or modifiable by the user.

The touch panel computer 1 sets either an "interlock mode" in which a display parameter is changed for a plurality of images in an interlocking manner in response to an operation instructing to change the display parameter performed on any one image or a "non-interlock mode" in which the display parameter is changed only for the one image on which the operation is performed, as the basic mode of the parameter change process, and controls a display parameter change according to the set basic mode. Here, an arrangement may be adopted in which the basic mode is set by the user at the start of the observation, as the initial setting, or either one of the modes is set as default setting and allows the user to arbitrarily change the default setting.

Under the "interlock mode" set as the basic mode of the parameter change process, the touch panel computer 1 basically changes, in response to a touch gesture instructing to change a specific display parameter performed on any one image, the display parameter according to the touch gesture for all the images. If an image somewhere in the display area of which is being pressed is present when the touch gesture is performed, however, the display parameter remains unchanged for that image while the display parameter is changed according to the touch gesture for all the images other than that image.

Figure 2:
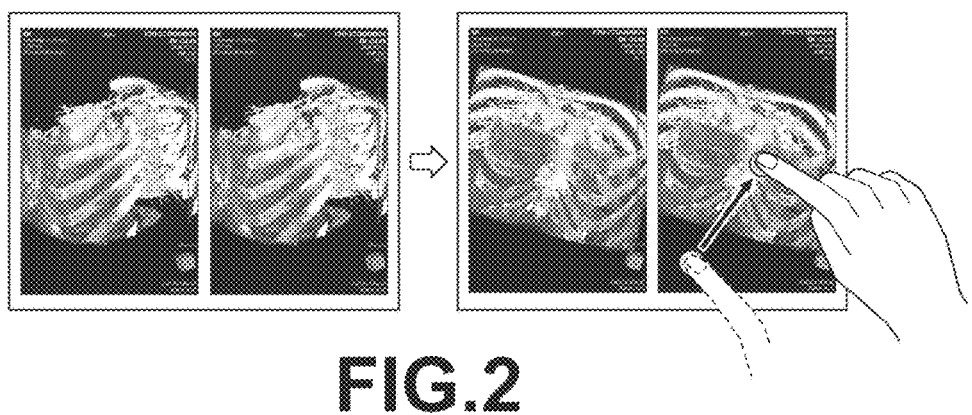
FIG. 2 shows an example display parameter change operation under interlock mode setting.
Figure 3:
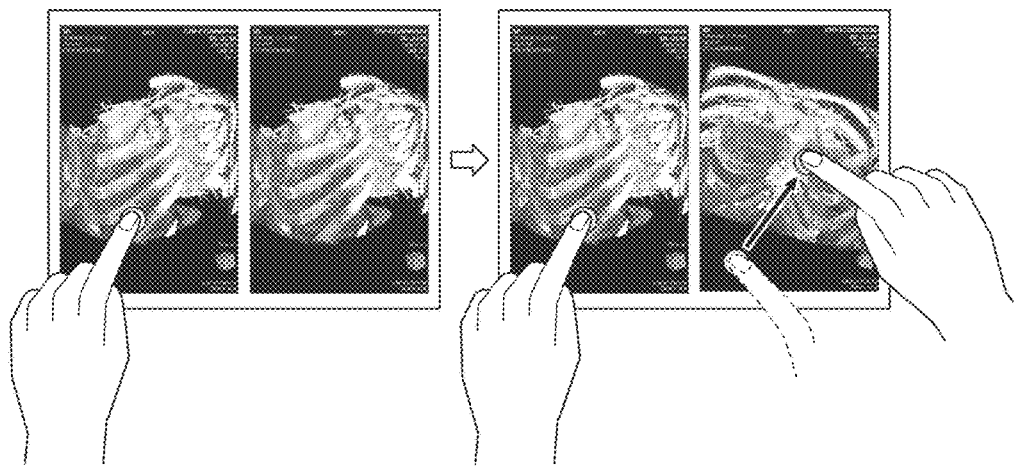
FIG. 3 shows an example display parameter change operation under interlock mode setting.
Figure 4:
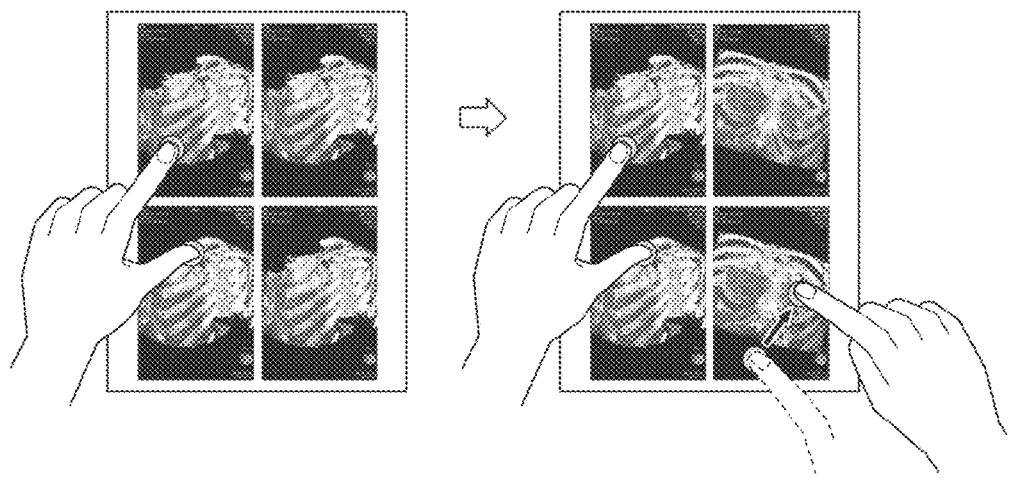
FIG. 4 shows an example display parameter change operation under interlock mode setting.

Specific examples of display parameter change processes under the "interlock mode" setting are shown in FIGS. 2 to 4. FIGS. 2 and 3 respectively show the cases where observation is performed by displaying two images on the touch panel. FIG. 2 shows that, according to a drag operation instructing to change the observation angle performed on the right side image with no other touch operations, such as "pressing" being performed on the left and right two images, the observation angle is changed according to the drag operation for both the left and right images, while FIG. 3 shows that, according to a drag operation instructing to change the observation angle performed on the right side image with the left side image being pressed, the observation angle is changed according to the drag operation only for the right side image.

FIG. 4 shows a case where observation is performed by displaying four images on the touch panel. FIG. 4 shows that, according to a drag operation instructing to change the observation angle performed on the lower right image with the upper left and lower left two images being pressed, the observation angle remains unchanged for the upper left and lower left images while the observation angle is changed according to the drag operation only for the upper right and lower right images.

On the other hand, under the "non-interlock mode" set as the basic mode of the parameter change process, the touch panel computer 1 basically changes, in response to a touch gesture instructing to change a specific display parameter performed on any one image, the display parameter according to the touch gesture only for the one image on which the gesture is performed. If an image somewhere in the display area of which is being pressed is present when the touch gesture is performed, however, the display parameter is changed according to the same touch gesture also for that image.

Figure 5:
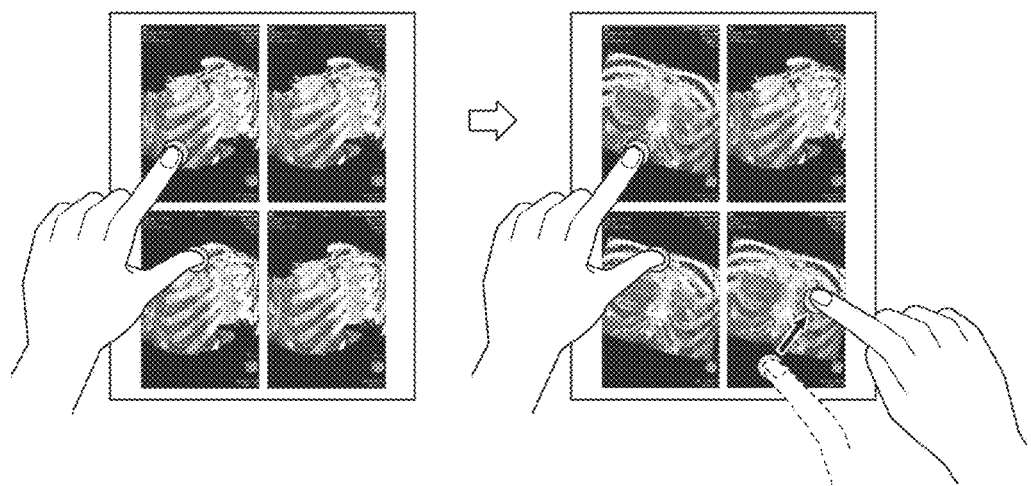
FIG. 5 shows an example display parameter change operation under non-interlock mode setting.

A specific example of display parameter change process under the "non-interlock mode" setting is shown in FIG. 5. FIG. 5 also shows a case where observation is performed by displaying four images on the touch panel. FIG. 5 shows that, in response to a drag operation instructing to change the observation angle performed on the lower right image with the upper left and lower left two images being pressed, the observation angle is changed according to the drag operation for the upper left and lower left images, as well as for the lower right image, while the observation angle remains unchanged for the upper right image.

With the foregoing configuration, according to the touch panel computer, operation method thereof, and program of the present embodiment, the user, such as a doctor, is allowed, when displaying a plurality of images side-by-side on the touch panel and performing observation while changing a display parameter, to switch between interlocking and non-interlocking for a display parameter change easily by an intuitive operation of directly "pressing" an image to be interlocked or non-interlocked. This allows work efficiency to be improved.

Further, as shown, for example, in FIGS. 4 and 5, when performing observation by displaying three or more images, the user, such as a doctor, may easily switch between interlocking and non-interlocking for a display parameter change with respect to each image by an intuitive operation of directly "pressing" some of the images to be interlocked or non-interlocked, thus processing in which a display parameter change is interlocked for some of the images while it is non-interlocked for the other images or similar processing may be performed easily and rapidly.

Next, a situation to which the computer with a touch panel, operation method thereof, and program of the present invention may be suitably applied will be described. For example, images of different body postures are sometimes used to observe the same position in the examination of a large intestine in order to improve the diagnostic accuracy. For example, imaging is performed in two body postures of supine position and prone position to obtain two sets of volume data for the respective body postures, then a large intestine region is extracted from each set of volume data, a path of the large intestine is extracted by thinning process, points at an equal distance from the start points along the paths are recognized as the points anatomically representing the same point, and an association process is performed. Then, using the correspondence relationship, a virtual endoscopic image is generated based on each set of volume data and displayed on the touch panel, and observation is performed while moving the viewpoint position of each virtual endoscopic image in an interlocking manner according to a user drag operation on the touch panel. Some images, however, may not extract large intestine regions appropriately and correspondence misalignment may sometimes occur. The present invention can be applied in such a case and observation is performed while moving the viewpoint positions of both of the virtual endoscopic images in an interlocking manner by a drag operation on either one of the images under the "interlock mode" setting during the time in which no misalignment occurs in the viewpoint positions. Then, if misalignment occurs in the viewpoint positions, the misalignment is corrected by performing a drag operation for a predetermined amount on one image with the other image being pressed to change the viewpoint position only for the one image, and the observation is resumed by the interlocking display by releasing the hand pressing the other image when the misalignment is eliminated.

Further, for example, there may be a case where a plurality of a series of cross-sectional images along the body axis obtained by imaging a predetermined region of a subject, including the spine, is displayed side-by-side, and observation is performed. In this case, in order to cause the center of the spine in each cross-sectional image to come to the center of the display area, a center line of the spine is set and a position on the cross-sectional image that intersects the set center line is identified as the center position of the spine, and processing to cause the identified position to come to the center of the display area is performed. Depending on how the center line of the spine is set, however, misalignment with the actual center of the spine may sometimes occur. Such misalignment often occurs in the same direction with substantially the same amount in some of a series of cross-sectional images. The present invention can be applied in such a case to perform a drag operation of a predetermined amount on one cross-sectional image to be operated with the other cross-sectional images of some of the cross-sectional images requiring correction of misalignment other than the one cross-sectional image to be operated under the "non-interlock mode" setting and to repeat this operation to change the display center positions several times for only those images, whereby the misalignment may be corrected easily and rapidly.

In the foregoing embodiment, the description has been made of a case in which the present invention is applied to a tablet computer, but the present invention may be applied widely, for example, to desktop computers, laptop computers, smart phones, and the like having touch panels as one of the user interfaces.

The computer according to the present invention may be any computer as long as it has at least a touch panel and may be those having other user interfaces, such as mice, keyboards, and the like, in addition to touch panels.

Further, in the foregoing embodiment, the description has been made of a case in which the tablet computer is configured to distinguish and recognize a plurality of gestures, but it is only necessary to recognize at least one gesture.

What is claimed is:

1. A method for operating a computer with a touch panel according to an operation performed by a user on the touch panel, the method comprising the steps of:
    displaying a plurality of images on the touch panel using a display parameter preset to each image;
    setting a display mode to either one of a first mode or a second mode;
    wherein, when the first mode is set, changing, when a touch gesture associated with changing the display parameter is performed on the touch panel for any one of the plurality of displayed images, the display parameter according to the touch gesture only for the image for which the touch gesture is performed and an image somewhere in the display area of which is being pressed when the touch gesture is performed; and
    wherein, when the second mode is set, changing, when a touch gesture associated with changing the display parameter is performed on the touch panel for any one of the plurality of displayed images, the display parameter according to the touch gesture for all of the images other than an image somewhere in the display area of which is being pressed when the touch gesture is performed.

2. A non-transitory recording medium containing a program for operating a computer with a touch panel according to an operation performed by a user on the touch panel, the program causing the computer to perform the steps of:
    displaying a plurality of images on the touch panel using a display parameter preset to each image;
    setting a display mode to either one of a first mode or a second modes;
    when the first mode is set, changing, when a touch gesture associated with changing the display parameter is performed on the touch panel for any one of the plurality of displayed images, the display parameter according to the touch gesture only for the image for which the touch gesture is performed and an image somewhere in the display area of which is being pressed, and which is different from the image for which the touch gesture is performed, when the touch gesture is performed; and
    when the second mode is set, changing, when a touch gesture associated with changing the display parameter is performed on the touch panel for any one of the plurality of displayed images, the display parameter according to the touch gesture for all of the images other than an image somewhere in the display area of which is being pressed when the touch gesture is performed.

3. A computer having a touch panel and being operated according to an operation performed by a user on the touch panel, the computer comprising:
    a display processing unit that displays a plurality of images on the touch panel using a display parameter preset to each image;
    a display mode processing unit which sets a display mode to either one of a first mode or a second mode;
    a parameter change processing unit that when the first mode is set, changes, when a touch gesture associated with changing the display parameter is performed on the touch panel for any one of the plurality of displayed images, the display parameter according to the touch gesture only for the image for which the touch gesture is performed and an image somewhere in the display area of which is being pressed, and which is different from the image for which the touch gesture is performed, when the touch gesture is performed, and when the second mode is set, changes, when a touch gesture associated with changing the display parameter is performed on the touch panel for any one of the plurality of displayed images, the display parameter according to the touch gesture for all of the images other than an image somewhere in the display area of which is being pressed when the touch gesture is performed.

4. The method of claim 1, wherein the touch gesture is any one of drag, flick, pinch-in, pinch-out, and double-tap operations.

5. The method of claim 1, wherein the display parameter is any one of display magnification, display center position, display angle, window level, window width, position of cross-section, and observation angle.

* * * * *